(12) United States Patent
Imai et al.

(10) Patent No.: US 7,687,962 B2
(45) Date of Patent: Mar. 30, 2010

(54) STATOR

(75) Inventors: Nobuyuki Imai, Utsunomiya (JP); Tadanobu Takahashi, Kawachi-gun (JP); Shigeru Tajima, Tokorozawa (JP); Junji Inoue, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 11/598,564

(22) Filed: Nov. 14, 2006

(65) Prior Publication Data

US 2007/0114871 A1    May 24, 2007

(30) Foreign Application Priority Data

Nov. 22, 2005    (JP)    ............... 2005-336783

(51) Int. Cl.
*H02K 17/00*    (2006.01)

(52) U.S. Cl. ................ 310/206; 310/184; 310/198

(58) Field of Classification Search ......... 310/179–184, 310/198, 201–208, 254, 261
See application file for complete search history.

(56) References Cited

U.S. PATENT DOCUMENTS 6,870,294 B2 * 3/2005 Holzheu et al. ............. 310/201
6,946,768 B2 * 9/2005 Kruse ........................ 310/179
7,432,625 B2 * 10/2008 Adaniya et al. ............. 310/180
2002/0063490 A1 * 5/2002 Asao et al. .................. 310/207
2003/0137213 A1 * 7/2003 Oohashi et al. ............. 310/263
2004/0012292 A1 * 1/2004 Kometani et al. ........... 310/184
2004/0207283 A1 * 10/2004 Oohashi et al. ............. 310/207

FOREIGN PATENT DOCUMENTS

JP    2002-165396 A    6/2002

* cited by examiner

*Primary Examiner*—Thanh Lam
(74) *Attorney, Agent, or Firm*—Arent Fox LLP

(57) ABSTRACT

In this stator, first and second U-phase loop windings and first and second W-phase loop windings are short-pitch wave windings, and the width in the circumferential direction of the slot between the U and V-phases in which the loop windings are disposed and the slot between the V and W-phases in which the loop windings are disposed is set to a value that is ½ the width in the circumferential direction of the slot between the W and U-phases in which the loop windings are disposed. The ratio of the first winding turns number of the loop windings and the second winding turns number of the loop windings is set so that when having added the induced voltages by the loop windings or having added the induced voltages by the loop windings in the slots, the phase difference of the induced voltages obtained by addition is 120 electrical degrees.

4 Claims, 8 Drawing Sheets dd# STATOR

BACKGROUND OF THE INVENTION

1. Field of the Invention

The present invention relates to a stator.

Priority is claimed on Japanese Patent Application No. 2005-336783, filed Nov. 22, 2005, the content of which is incorporated herein by reference.

2. Description of Related Art

There is known a three-phase motor that drives a rotor in three phases (namely, U-phase, V-phase, W-phase) with a stator wound with coils of each phase that traverse the circumference in a wave shape by weaving between adjacent teeth (see, for example, Japanese Unexamined Patent Application, First Publication No. 2002-165396).

It is possible to constitute a stator for a three-phase motor in which loop windings of two phases having a mutual phase difference of, for example, 60 or 240 electrical degrees are connected in a V-shape and energized by sine waves with a mutual phase difference of 120 electrical degrees. Such a stator can serve as one capable of generating a rotating magnetic field similarly to a stator of a three-phase motor according to the aforementioned prior art, in which the coils of the U, V, and W-phases are connected in a Y-shape and energized by sine waves with a mutual phase difference of 120 electrical degrees. In the stator, in the case of the loop windings of two phases being short-pitch wave windings displaced 120 electrical degrees, the number of phases of the loop windings mounted in the slots between stator teeth that are adjacent in the circumferential direction is one or two, and thus non-uniform. For this reason, by setting the interval between adjacent teeth in the circumferential direction so as to be non-uniform, a reduction in the winding wire space factor in accordance with the number of phases of the loop windings mounted on the slots can be prevented.

However, setting the interval between adjacent teeth in the circumferential direction so as to be non-uniform causes deviations in the phase difference in the loop windings of two phases, thereby causing deviations in the phases of each phase current. For this reason, in ordinary vector control presupposing the current phase difference between each phase current to be $2\pi/3=120$ electrical degrees, appropriate current control becomes difficult.

SUMMARY OF THE INVENTION

The present invention was achieved in view of the above circumstances, and has as its object to provide a stator that can readily perform appropriate control.

In order to solve the aforementioned problem and achieve the object, a first aspect of the present invention is a stator for a three-phase motor including loop windings of two phases, a plurality of teeth that are adjacent in a circumferential direction, and a plurality of slots that are formed between the plurality of teeth, with the loop windings of two phases mounted with mutually different numbers of winding turns in each of the slots.

According to the stator of the aforementioned constitution, since the loop windings of two phases are mounted in each slot, the induced voltages of the loop windings are added. In accordance with a state quantity (for example, a winding turns ratio) according to each winding turns number of the loop windings of two phases to be added, a phase of the induced voltage vector obtained by addition can be set to a suitable value. By setting the winding turns number so that the phase difference of the induced voltage vectors of two phases obtained by addition becomes a specified phase difference (for example, 120 electrical degrees), suitable current control can be readily and properly applied to a motor provided with this stator. The current control is assumed on the current phase difference between each of the phase currents being a specified phase difference, as in ordinary vector control and the like that assumes that the current phase difference between each of the phase currents is $2\pi/3=120$ electrical degrees.

A second aspect of the present invention is a stator for a three-phase motor including loop windings of two phases, a plurality of teeth that are adjacent in a circumferential direction; and slots formed between the teeth, with a winding turns ratio of the loop windings of two phases differing between adjacent slots in the circumferential direction.

According to the stator of the aforementioned constitution, since the loop windings of two phases are mounted in each slot, the induced voltages of the loop windings are added. In accordance with the winding turns ratio of the loop windings of two phases to be added, the phase of the induced voltage vector obtained by addition can be set to a suitable value. By setting the winding turns ratio so that the phase difference of the induced voltage vectors of two phases obtained by addition becomes a specified phase difference (for example, 120 electrical degrees), suitable current control can be readily and properly applied to a motor provided with this stator. The current control is assumed on the current phase difference between each of the phase currents being a specified phase difference, such as in ordinary vector control and the like that assumes that the current phase difference between each of the phase currents is $2\pi/3=120°$ (electrical degrees).

In the aforedescribed stator, the loop windings of two phases may be short-pitch windings, and the interval in the circumferential direction between the teeth that are adjacent in the circumferential direction may be set to be non-uniform.

In this case, in the case of the loop windings of two phases being short-pitch wave windings of 120 electrical degrees, the number of phases of the loop windings mounted on the slots between teeth that are adjacent in the circumferential direction is one or two phases, being non-uniform. For this reason, by setting the interval between the teeth so as to be non-uniform in accordance with the number of phases of the loop windings to be mounted, reductions in the winding wire space factor of the slots can be prevented.

Moreover, since the interval between adjacent teeth in the circumferential direction is set so as to be non-uniform, even when deviations in the phases of each phase current occur with deviations in the phase difference in the loop windings of two phases, by the mounting of loop windings of two phases with mutually different numbers of winding turns in each of the slots, the induced voltages of the loop windings of two phases are added in each slot, and the phase difference of the induced voltage vectors of two phases is set to a specified phase difference. Accordingly, suitable current control can be readily and properly applied to a motor provided with this stator. The current control may be assumed on the current phase difference between each of the phase currents being a specified phase difference, as in ordinary vector control and the like that assumes that the current phase difference between each of the phase currents is $2\pi/3=120$ electrical degrees.

In the aforedescribed stator, the winding turns ratio of the loop windings of two phases disposed in each slot may be set so that the electrical angle phase difference of each phase is substantially equivalent.

Since the winding turns ratio is set so that the electrical angle phase difference of each of the three phases is substantially equivalent in one cycle of electrical angle, for example, the electrical angle phase difference is approximately 120 electrical degrees. Accordingly, ordinary vector control can be readily and suitably applied on the assumption that the current phase difference between each of the phase currents is $2\pi/3=120$ electrical degrees in a motor provided with this stator.

In the aforedescribed stator, the loop windings of two phases may be full-pitch windings, and the winding turns ratio of the loop windings of two phases disposed in each slot may be set so that the electrical angle phase difference of each phase is substantially 120 electrical degrees.

In this case, in a stator for a three-phase motor provided with two-phase loop windings that are full-pitch windings with a coil pitch of 180 electrical degrees, for example, by setting the width of the teeth in the circumferential direction to an equivalent value, even in the case of the phase difference between the loop windings of two phases becoming 270 electrical degrees, since the loop windings of two phases are mounted in each slot, the induced voltages of the loop windings of two phases in each slot are added, and the phase difference of the induced voltage vectors of two phases is set so as to be 120 electrical degrees. Accordingly, ordinary vector control on the assumption that the current phase difference between each of the phase currents is $2\pi/3=120$ electrical degrees can be readily and suitably applied to a motor provided with this stator.

BRIEF DESCRIPTION OF THE REFERENCE SYMBOLS

10, 60: stator
14a, 64a: first U-phase loop winding (loop winding)
14b, 64b: second U-phase loop winding (loop winding)
15a, 65a: first W-phase loop winding (loop winding)
15b, 65b: second W-phase loop winding (loop winding)
22, 72: U-phase teeth (teeth)
24, 74: V-phase teeth (teeth)
26, 76: W-phase teeth (teeth)
27, 77: slot between the U and V-phases (slot)
28, 78: slot between the V and W-phases (slot)
29: slot between the W and U-phases (slot)

DETAILED DESCRIPTION OF THE INVENTION

A first embodiment of a stator of the present invention shall be described below with reference to the accompanying drawings.

A stator 10 according to the present embodiment constitutes a claw pole motor mounted, for example, in a hybrid vehicle as a drive source of the vehicle together with an internal combustion engine. For example, in a parallel hybrid vehicle of a structure in which the internal combustion engine, the claw pole motor, and the gear transmission are directly linked, the drive power of at least either the internal combustion engine or the claw pole motor is transmitted to the drive wheels of the vehicle through the transmission.

When drive power is transmitted to the claw pole motor from the drive wheels during deceleration of this hybrid vehicle, the claw pole motor will function as a generator that generates so-called regenerative-braking force and recover the kinetic energy of the vehicle in the form of electrical energy (regenerative energy). Furthermore, the claw pole motor also functions as a generator to produce electrical energy even when the power of the internal combustion engine is transmitted to the claw pole motor.

Figure 1:
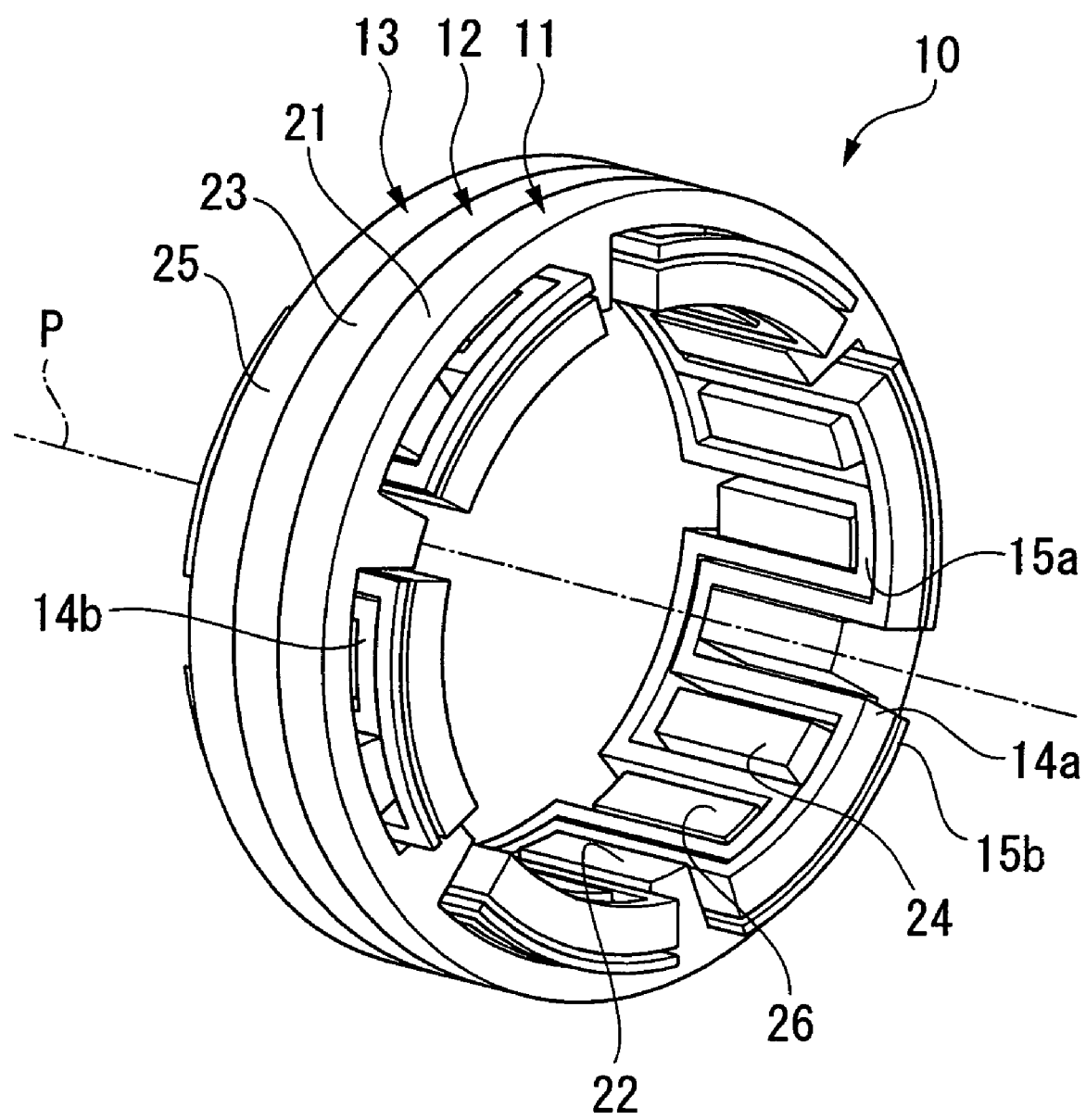
FIG. 1 is a perspective view showing a stator according to a first embodiment of the present invention.

As shown for example in FIG. 1, the stator 10, which generates a rotating magnetic field for rotating a rotor (not illustrated), is provided with a U-phase stator ring 11, a V-phase stator ring 12, and a W-phase stator ring 13 for which each of three phases (U-phase, V-phase, and W-phase), and first and second U-phase loop windings 14a and 14b and first and second W-phase loop windings 15a and 15b of two phases (U-phase and W-phase).

The U-phase stator ring 11 includes a ring-shaped U-phase yoke 21 and U-phase teeth 22. The U-phase teeth 22 project inward in a radial direction R from positions spaced at a specified interval in a circumferential direction C on an inner circumferential portion of the U-phase yoke 21, and project in a first direction along an axis P, with a cross-sectional shape in the radial direction R being rectangular. The cross-sectional shape in the circumferential direction C of the U-phase stator ring 11 constituted from the U-phase yoke 21 and the U-phase teeth 22 is L-shaped.

The V-phase stator ring 12 includes a ring-shaped V-phase yoke 23 and V-phase teeth 24. The V-phase teeth 24 project inward in the radial direction R from positions spaced at a specified interval in the circumferential direction C on the inner circumferential portion of the V-phase yoke 23, and project in the first direction and a second direction along the axis P, with a cross-sectional shape in the radial direction R being rectangular. The cross-sectional shape in the circumferential direction C of the V-phase stator ring 12 constituted from the V-phase yoke 23 and the V-phase teeth 24 is T-shaped.

The W-phase stator ring 13 includes a ring-shaped W-phase yoke 25 and W-phase teeth 26. The W-phase teeth 26 project inward in the radial direction R from positions spaced at a specified interval in the circumferential direction C on the inner circumferential portion of the W-phase yoke 25, and project in the second direction along the axis P, with the cross-sectional shape in the radial direction R being rectangular. The cross-sectional shape in the circumferential direction C of the W-phase stator ring 13 constituted from the W-phase yoke 25 and the W-phase teeth 26 is L-shaped.

Figure 2:
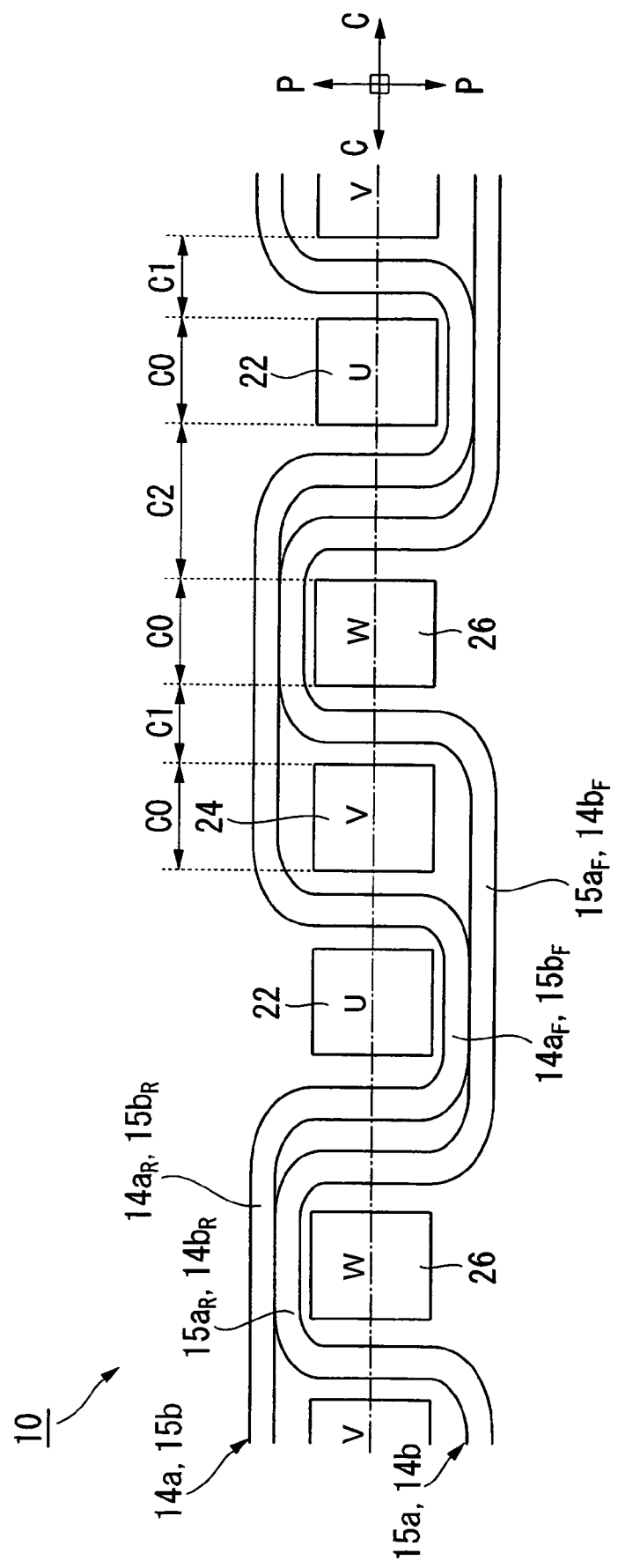
FIG. 2 is a drawing showing main portions of the stator shown in FIG. 1, viewed from an inner side to an outer side along a radial direction R.

The stator rings 11, 12, and 13 are joined so that the yokes 21, 23, and 25 are superimposed in the axial direction P. As shown for example in FIG. 2 and FIG. 3, the plurality of teeth 22, 24, and 26 are arranged in the circumferential direction C in a specified order (for example, in the order of U-phase tooth 22, V-phase tooth 24, and W-phase tooth 26, and so on). A slot between the U and V-phase teeth (hereinafter, "UV-phase slot") 27 where the first U-phase loop winding 14a and the second W-phase loop winding 15b of two phases are disposed is formed between the teeth 22 and 24 that are adjacent in the circumferential direction C. A slot between the V and W-phase teeth (hereinafter, "VW-phase slot") 28 where the second U-phase loop winding 14b and the first W-phase loop winding 15a of two phases are disposed is formed between the teeth 24 and 26 that are adjacent in the circumferential direction C. A slot between the W and U-phase teeth (hereinafter, "WU-phase slot") 29 where the first and second U-phase loop windings 14a and 14b and the first and second W-phase loop windings 15a and 15b are disposed is formed between the teeth 22 and 26 that are adjacent in the circumferential direction C.

The loop windings 14a, 14b, 15a, and 15b are short-pitch wave windings that are wound on the teeth 22, 24, and 26 so as to weave between the teeth 22 and 24, between the teeth 24 and 26, and between the teeth 22 and 26 while meandering within the circumferential surface around the axis. The first U-phase loop winding 14a and the second U-phase loop winding 14b are connected in series, and the first W-phase loop winding 15a and the second W-phase loop winding 15b are connected in series.

The first U-phase loop winding 14a and the second W-phase loop winding 15b have lateral portions $14a_F$ and $15b_F$, respectively, provided on a first side of the U-phase teeth 22 in the axial direction P, and lateral portions $14a_R$ and $15b_R$, respectively, provided on a second side of the V-phase teeth 24 and the W-phase teeth 26 in the axial direction P.

The second U-phase loop winding 14b and the first W-phase loop winding 15a have lateral portions $14b_F$ and $15a_F$, respectively, provided on the first side of the U-phase teeth 22 and the V-phase teeth 24 in the axial direction P, and lateral portions $14b_R$ and $15a_R$, respectively, provided on the second side of the W-phase teeth 26 in the axial direction P.

Figure 3:
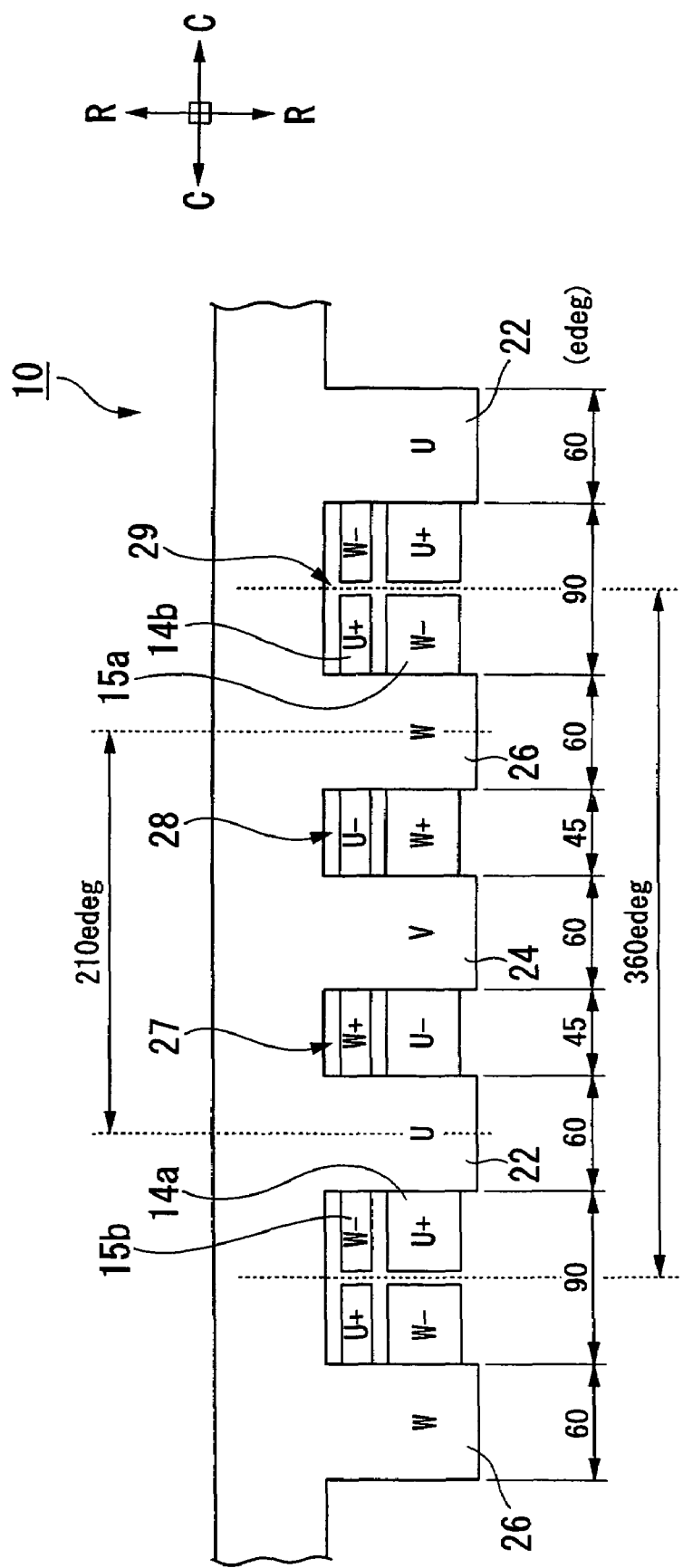
FIG. 3 is a drawing schematically showing a cross section of the stator shown in FIG. 1 along an axial direction P.

In FIG. 3 that schematically shows a cross section of the stator 10 with respect to the axial direction P, for example in the case of traversing the circumference along the circumferential direction C, the U-phase loop windings 14a and 14b disposed in the WU-phase slots 29 so as to head from the second direction side to the first direction side in the axial direction P are "U+", and the U-phase loop windings 14a and 14b that are separately disposed between the UV-phase slots 27 and the VW-phase slots 28, respectively, so as to head from the first direction side to the second direction side in the axial direction P are each "U−". For example, in the case of traversing the circumference along the circumferential direction C, the W-phase loop windings 15a and 15b disposed in the UV-phase slots 27 and the VW-phase slots 28, respectively, so as to head from the first direction side to the second direction side in the axial direction P are each "W+", and the W-phase loop windings 15a and 15b disposed in the WU-phase slots 29 so as to head from the second direction side to the first direction side in the axial direction P are "W−".

The teeth 22, 24, and 26 of the stator rings 11, 12, and 13, respectively, have identical widths in the axial direction and width C0 in the circumferential direction. The intervals between the teeth 22, 24, and 26 that are adjacent in the circumferential direction C, that is, the widths in the circumferential direction of the slots 27, 28, and 29, are set to a value corresponding to the total number of windings by the loop windings 14a, 14b, 15a, and 15b disposed in the slots 27, 28, and 29, for example, a value proportional to the total number of windings.

The first U-phase loop winding 14a and the first W-phase loop winding 15a are set to have an identical first winding turns number n1. Also, the second U-phase loop winding 14b and the second W-phase loop winding 15b are set to have an identical second winding turns number n2 (n2≠n1). The ratio of the first winding turns number n1 to the second winding turns number n2 (winding turns ratio n1/n2) is set to have a specified value explained below.

That is, a circumferential width C1 of the UV-phase slot 27 where the first U-phase loop winding 14a and the second W-phase loop winding 15b of two phases are mounted and the VW-phase slot 28 where the second U-phase loop winding 14b and the first W-phase loop winding 15a of two phases are mounted is set to be a value smaller than a circumferential width C2 of the WU-phase slot 29 where the first and second U-phase loop windings 14a and 14b and the first and second W-phase loop windings 15a and 15b are disposed, for example a value of ½ the circumferential width C2 (C2/2).

For example, as shown in FIG. 3, in one cycle of electrical angle, the ratio of the phase of the teeth 22, 24, and 26, i.e., the phase of a magnetic body, and the phase of the coils 14a, 14b, 15a, and 15b, i.e., the phase of a conductive body, of the stator 10 is set so as to be 1:1.

Thereby, the circumferential width C0 of the teeth 22, 24, and 26 is equivalent to an electrical angle of 60 degrees. The circumferential widths C1 of the UV-phase slot 27 and the VW-phase slot 28 are equivalent to an electrical angle of 45 degrees. The circumferential width C2 of the WU-phase slot 29 is equivalent to an electrical angle of 90 degrees.

The phase difference of the first U-phase loop winding 14a and the first W-phase loop winding 15a of two phases and the phase difference of the second U-phase loop winding 14b and the second W-phase loop winding 15b of two phases are respectively 210 electrical degrees.

The ratio of the first winding turns number n1 of the first U-phase loop winding 14a and the first W-phase loop winding 15a, and the second winding turns number n2 of the second U-phase loop winding 14b and the second W-phase loop winding 15b (winding turns ratio n1/n2) is set to a value so that when adding the induced voltage by the first U-phase loop winding 14a and the induced voltage by the second W-phase loop winding 15b, or adding the induced voltage by the first W-phase loop winding 15a and the induced voltage by the second U-phase loop winding 14b, the phase difference of the induced voltages obtained by addition is 120 electrical degrees in the slots 27, 28, and 29 respectively.

The first and second U-phase loop windings 14a and 14b connected in series and the first and second W-phase loop windings 15a and 15b connected series are thus connected in a V-shape and energized with sine waves having a mutual phase difference of 120 electrical degrees. Thereby, when leakage flux can be disregarded, a rotating magnetic field is produced similar to that of a stator of a three-phase motor in which its coils of the U, V, and W-phases are connected in a Y-shape and energized by sine waves with a mutual phase difference of 120 electrical degrees.

That is, ignoring phase resistance, the voltage equation of a three-phase (U-phase, V-phase, W-phase) motor is expressed as shown in Eq. (1) below, with $V_u$, $V_v$, and $V_w$ being respective phase voltage command values; $I_u$, $I_v$, and $I_w$ being respective phase currents; L being self-inductance of each phase; M being mutual inductance; ω being rotational angular velocity of the rotor; and Ke being an induced voltage constant.

Note, that in Eq. (1), L=−2M, and leakage flux is ignored.

$$\begin{bmatrix} V_u \\ V_v \\ V_w \end{bmatrix} = \frac{d}{dt}\begin{bmatrix} L & M & M \\ M & L & M \\ M & M & L \end{bmatrix}\begin{bmatrix} I_u \\ I_v \\ I_w \end{bmatrix} + \omega Ke \begin{bmatrix} \sin\omega t \\ \sin\left(\omega t - \frac{2}{3}\pi\right) \\ \sin\left(\omega t + \frac{2}{3}\pi\right) \end{bmatrix} \quad (1)$$

$$\approx \frac{d}{dt}L\begin{bmatrix} 2 & -1 & -1 \\ -1 & 2 & -1 \\ -1 & -1 & 2 \end{bmatrix}\begin{bmatrix} I_u \\ I_v \\ I_w \end{bmatrix} + \omega Ke \begin{bmatrix} \sin\omega t \\ \sin\left(\omega t - \frac{2}{3}\pi\right) \\ \sin\left(\omega t + \frac{2}{3}\pi\right) \end{bmatrix}$$

In Eq. (1), since the phase currents $I_u$, $I_v$, and $I_w$ can be expressed by any two phase currents, by canceling out the V-phase current $I_v$ with the U-phase current $I_u$ and the W-phase current $I_w$, line voltage from the phase voltage command values $V_u$, $V_v$, and $V_w$ (for example, line voltage $V_{uv}$ between the U-phase and V-phase (=$V_u - V_v$), and line voltage $V_{wv}$ between the W-phase and V-phase (=$V_w - V_v$)) is expressed as shown in Eq. (2) below.

$$\begin{bmatrix} V_{uv} \\ V_{wv} \end{bmatrix} = \begin{bmatrix} 1 & -1 & 0 \\ 0 & -1 & 1 \end{bmatrix}\begin{bmatrix} V_u \\ V_v \\ V_w \end{bmatrix} \quad (2)$$

$$= \begin{bmatrix} 1 & -1 & 0 \\ 0 & -1 & 1 \end{bmatrix}\frac{d}{dt}\begin{bmatrix} L & M & M \\ M & L & M \\ M & M & L \end{bmatrix}\begin{bmatrix} 1 & 0 \\ -1 & -1 \\ 0 & 1 \end{bmatrix}\begin{bmatrix} I_u \\ I_w \end{bmatrix} +$$

$$\begin{bmatrix} 1 & -1 & 0 \\ 0 & -1 & 1 \end{bmatrix}\omega Ke\begin{bmatrix} \sin\omega t \\ \sin\left(\omega t - \frac{2}{3}\pi\right) \\ \sin\left(\omega t + \frac{2}{3}\pi\right) \end{bmatrix}$$

$$= \frac{d}{dt}(L-M)\begin{bmatrix} 2 & 1 \\ 1 & 2 \end{bmatrix}\begin{bmatrix} I_u \\ I_w \end{bmatrix} + \omega Ke\begin{bmatrix} \sqrt{3}\sin\left(\omega t + \frac{\pi}{6}\right) \\ \sqrt{3}\cos\omega t \end{bmatrix}$$

$$\approx \frac{d}{dt}L\begin{bmatrix} 3 & 1.5 \\ 1.5 & 3 \end{bmatrix}\begin{bmatrix} I_u \\ I_w \end{bmatrix} + \omega Ke\begin{bmatrix} \sqrt{3}\sin\left(\omega t + \frac{\pi}{6}\right) \\ \sqrt{3}\cos\omega t \end{bmatrix}$$

A model that eliminates, for example, the V-phase from the voltage equation of three-phase (U-phase, V-phase, W-phase) motor shown in Eq. (1) above is described as shown in Eq. (3) below.

$$\begin{bmatrix} V_u \\ V_w \end{bmatrix} = \frac{d}{dt}\begin{bmatrix} L & M \\ M & L \end{bmatrix}\begin{bmatrix} I_u \\ I_w \end{bmatrix} + \omega Ke\begin{bmatrix} \sin\omega t \\ \sin\left(\omega t + \frac{2}{3}\pi\right) \end{bmatrix} \quad (3)$$

$$\approx \frac{d}{dt}L\begin{bmatrix} 1 & -0.5 \\ -0.5 & 1 \end{bmatrix}\begin{bmatrix} I_u \\ I_w \end{bmatrix} + \omega Ke\begin{bmatrix} \sin\omega t \\ \sin\left(\omega t + \frac{2}{3}\pi\right) \end{bmatrix}$$

By inverting the orientation of the W-phase coil (that is, inverting the direction of rotation of the rotor), the model shown in Eq. (3) above is expressed as shown in Eq. (4) below.

$$\begin{bmatrix} V_u \\ V_w \end{bmatrix} = \frac{d}{dt}\begin{bmatrix} L & -M \\ -M & L \end{bmatrix}\begin{bmatrix} I_u \\ I_w \end{bmatrix} + \omega Ke\begin{bmatrix} \sin\omega t \\ -\sin\left(\omega t + \frac{2}{3}\pi\right) \end{bmatrix} \quad (4)$$

$$\approx \frac{d}{dt}L\begin{bmatrix} 1 & 0.5 \\ 0.5 & 1 \end{bmatrix}\begin{bmatrix} I_u \\ I_w \end{bmatrix} + \omega Ke\begin{bmatrix} \sin\omega t \\ -\sin\left(\omega t + \frac{2}{3}\pi\right) \end{bmatrix}$$

By altering the number of turns "n" of the coils to a multiple of √3, the model shown in Eq. (4) above can be expressed as shown in Eq. (5) below.

$$\begin{bmatrix} V_u \\ V_w \end{bmatrix} = \frac{d}{dt}3\begin{bmatrix} L & -M \\ -M & L \end{bmatrix}\begin{bmatrix} I_u \\ I_w \end{bmatrix} + \omega Ke\begin{bmatrix} \sqrt{3}\sin\omega t \\ -\sqrt{3}\sin\left(\omega t + \frac{2}{3}\pi\right) \end{bmatrix} \quad (5)$$

$$\approx \frac{d}{dt}L\begin{bmatrix} 3 & 1.5 \\ 1.5 & 3 \end{bmatrix}\begin{bmatrix} I_u \\ I_w \end{bmatrix} + \omega Ke\begin{bmatrix} \sqrt{3}\sin\omega t \\ -\sqrt{3}\sin\left(\omega t + \frac{2}{3}\pi\right) \end{bmatrix}$$

By moving the angle of origin of the phase of the induced voltages by 90 degrees (=π/2) and performing substitution with the U-phase component and the W-phase component, the model shown in the above-mentioned Eq. (5) can be expressed as Eq. (6) below, which is equivalent to the above-mentioned Eq. (2).

$$\begin{bmatrix} V_u \\ V_w \end{bmatrix} = \frac{d}{dt}3\begin{bmatrix} L & -M \\ -M & L \end{bmatrix}\begin{bmatrix} I_u \\ I_w \end{bmatrix} + \omega Ke\begin{bmatrix} \sqrt{3}\sin\left(\omega t + \frac{\pi}{6}\right) \\ \sqrt{3}\cos\omega t \end{bmatrix} \quad (6)$$

$$\approx \frac{d}{dt}L\begin{bmatrix} 3 & 1.5 \\ 1.5 & 3 \end{bmatrix}\begin{bmatrix} I_u \\ I_w \end{bmatrix} + \omega Ke\begin{bmatrix} \sqrt{3}\sin\left(\omega t + \frac{\pi}{6}\right) \\ \sqrt{3}\cos\omega t \end{bmatrix}$$

Figure 4A:
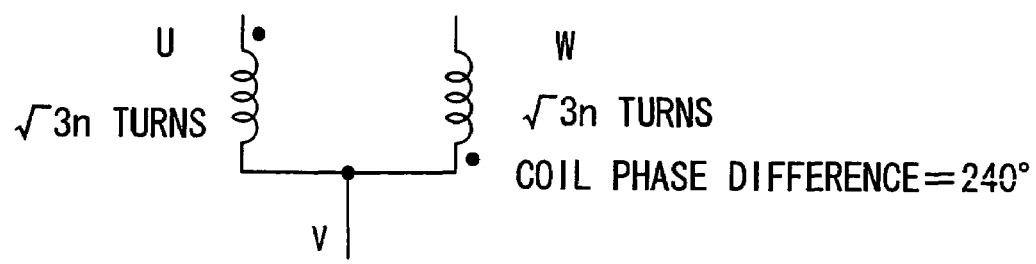
FIG. 4A is a drawing showing a connected state of loop windings of the stator shown in FIG. 1.
Figure 4B:
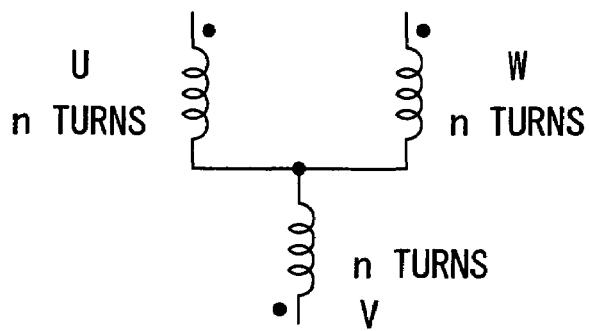
FIG. 4B is a drawing showing a connected state of each windings of a three-phase (U-phase, V-phase, and W-phase) stator.

Thus, as shown for example in FIG. 4A, a stator in which a U-phase coil and a W-phase coil of two phases having a phase difference (coil phase difference) of 240 electrical degrees are connected in a V-shape and energized with sine waves having a mutual phase difference of 120 electrical degrees can generate a rotating magnetic field identical to that of a stator of a three-phase motor as shown in FIG. 4B having coils of three phases, namely U, V, and W-phases, (that is, coils of three phases having a phase difference of 120 electrical degrees) that are connected in a Y-shape and energized by sine waves with a mutual phase difference of 120 electrical degrees.

Figure 5A:
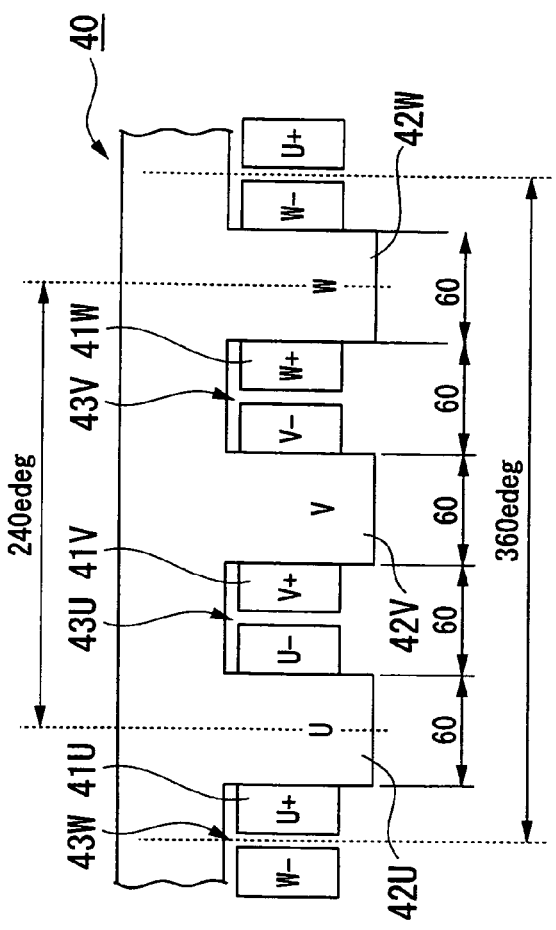
FIG. 5A is a drawing schematically showing a cross section with respect to an axial direction P of a stator according to a first reference example for the first embodiment of the present invention.

For example, a first reference example shown in FIG. 5A is a stator 40 for a three-phase motor provided with windings 41U, 41V, and 41W of the three phases U, V, and W, respectively, with the width in the circumferential direction of teeth 42U, 42V, and 42W set to the same value, and the width in the circumferential direction of slots 43U, 43V, and 43W between adjacent teeth being set to the same value. In this stator 40, in one cycle of electrical angle, the ratio of the phase of each of the teeth 42U, 42V, and 42W, i.e., the phase of a magnetic body, and the phase of the three-phase windings 41U, 41V, and 41W, i.e., the phase of a conductive body, of the stator 40 is set so as to be 1:1. Thereby, the width in the circumferential direction of each of the teeth 42U, 42V, and 42W is equivalent to 60 electrical degrees, and the width in the circumferential direction of each of the slots 43U, 43V, and 43W is equivalent to 60 electrical degrees, so that the phase difference between the U-phase winding 41U and the W-phase winding 41W is 240 electrical degrees. As a result, in a motor provided with the stator 40 constituted in this way, suitable current control is possible by ordinary vector control on the assumption that the current phase difference between each of the phase currents is 2π/3=120 electrical degrees.

Figure 5B:
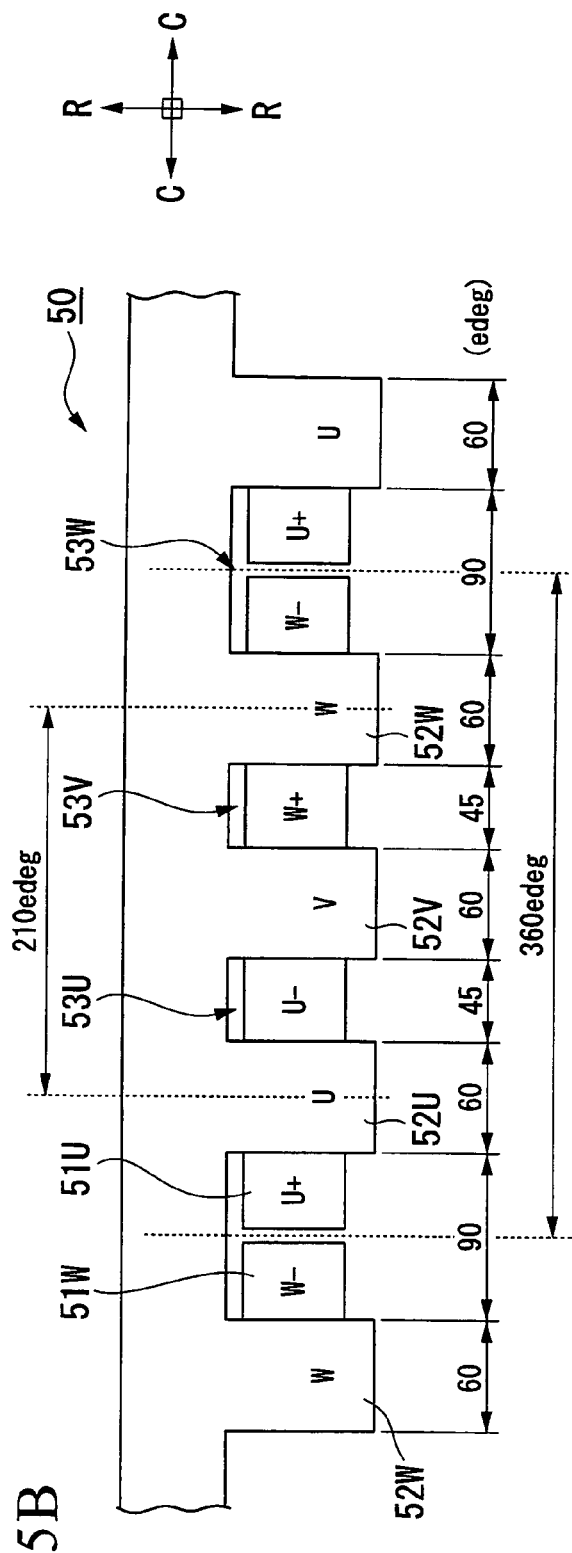
FIG. 5B is a drawing schematically showing a cross section with respect to an axial direction P of a stator according to a second reference example for the first embodiment of the present invention.

For example, a second reference example shown in FIG. 5B, is a stator 50 for a three-phase motor provided with two-phase windings 51U and 51W of the U-phase and W-phase, respectively, with the width in the circumferential direction of teeth 52U, 52V, and 52W set to the same value, and a width in a circumferential direction of a slot between U-phase and V-phase (hereinafter "UV-phase slot") 53U in which the U-phase winding 51U is disposed and a slot between V-phase and W-phase (hereinafter "VW-phase slot") 53V in which the W-phase winding 51W is disposed are set to a value of half the width in the circumferential direction of a slot between W-phase and V-phase (hereinafter "WU-phase slot") 53W in which the U-phase winding 51U and the W-phase winding 51W of two phases are disposed. In this stator 50, the width in the circumferential direction of each of the teeth 52U, 52V, and 52W is equivalent to 60 electrical degrees, and the width in the circumferential direction of the UV-phase slot 53U and the VW-phase slot 53V, respectively, is equivalent to 45 electrical degrees, and the width in the circumferential direction of the WU-phase slot 53W is equivalent to 90 electrical degrees, so that the phase difference between the U-phase winding 51U and the W-phase winding 51W is 210 electrical degrees. As a result, in a motor provided with the stator 50 constituted in this way, suitable current control is difficult by ordinary vector control on the assumption that the current phase difference between each of the phase currents is 2π/3=120 electrical degrees.

The stator 50 of this second reference example is equivalent to a constitution that omits the second U-phase loop winding 14b and the second W-phase loop winding 15b from the stator 10 according to the present embodiment shown in FIG. 3. By providing the second U-phase loop winding 14b and the second W-phase loop winding 15b in the stator 10 according to the present embodiment, each of the induced voltages of the first U-phase loop winding 14a and the first W-phase loop winding 15a are added with the induced voltages of the second U-phase loop winding 14b and the second W-phase loop winding 15b.

Figure 6C:
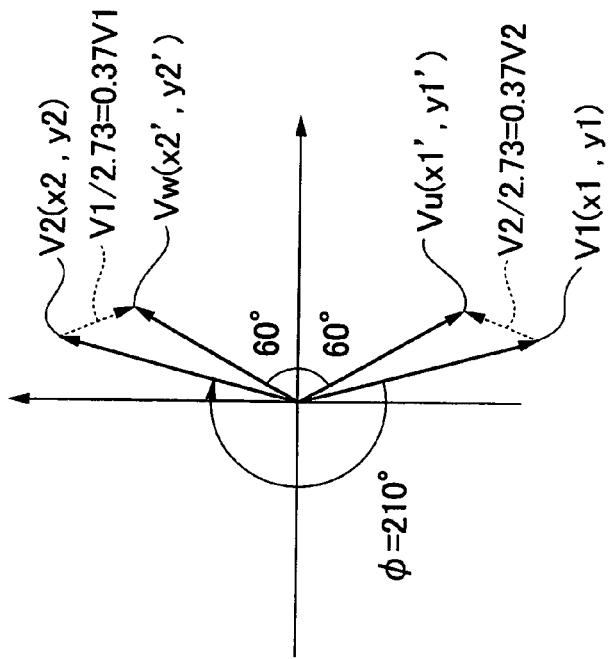
FIGS. 6A to 6C are drawings showing examples of induced voltage vectors V1 (x1, y1) and V2 (x2, y2) prior to addition, and induced voltage vectors Vu (x1', y1') and Vw (x2', y2') after addition.
Figure 6A:
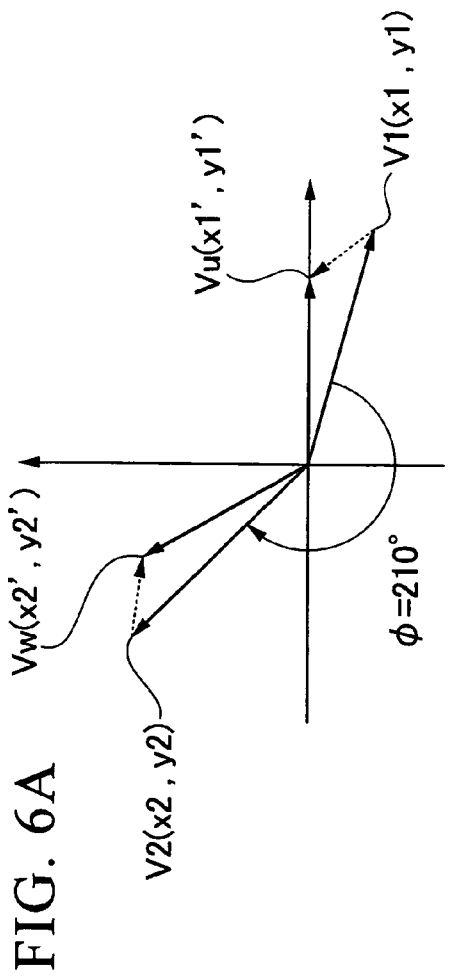

That is, in the stator 10 according to the present embodiment, with respect to the winding turns numbers n1 and n2 of the added loop windings 14a, 15a and 14b, 15b, the induced voltage vectors prior to addition shown for example in FIG. 6A, that is, the induced voltage vector V1 (x1, y1) of the first U-phase loop winding 14a and the induced voltage vector V2 (x2, y2) of the first W-phase loop winding 15a, the induced voltage vectors after addition shown for example in FIG. 6A, that is, the induced voltage vector Vu (x1', y1') by addition of the first U-phase loop winding 14a and the second W-phase loop winding 15b and the induced voltage vector Vw (x2', y2') by addition of the first W-phase loop winding 15a and the second U-phase loop winding 14b, are expressed, for example, as Eq. (7) below $$\begin{bmatrix} x1' \\ y1' \end{bmatrix} = \begin{bmatrix} x1 & x2 \\ y1 & y2 \end{bmatrix}\begin{bmatrix} n1 \\ n2 \end{bmatrix} \\ \begin{bmatrix} x2' \\ y2' \end{bmatrix} = \begin{bmatrix} x2 & x1 \\ y2 & y1 \end{bmatrix}\begin{bmatrix} n1 \\ n2 \end{bmatrix} \end{Bmatrix} \quad (7)$$

Figure 6B:
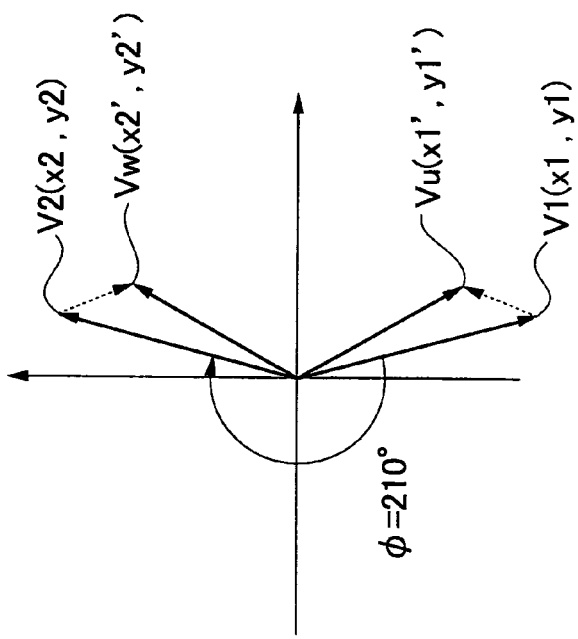

In Eq. (7) above, by multiplying both sides by a coordinate rotation matrix, Eq. (8) below is obtained. Therefore, as shown, for example, in FIG. 6B, in a state of a given intermediate angle between the induced voltage vectors V1 (x1, y1) and V2 (x2, y2) prior to addition and a given intermediate angle between the induced voltage vectors Vu (x1', y1') and Vw (x2', y2') after addition serving as the angle origin, Eq. (9) below is derived with a suitable coefficient "k" for adjusting the total number of windings by the windings 14a, 14b, 15a, and 15b in each of the slots 27, 28, and 29.

In Eq. (9) below, setting the phase difference between the induced voltage vectors Vu (x1', y1') and Vw (x2', y2') after addition to be 120 electrical degrees, according to a phase difference φ (for example, 210 electrical degrees) between the induced voltage vectors V1 (x1, y1) and V2 (x2, y2) prior to addition, the phase difference α (for example, 150 degrees) =360 degrees−φ.

$$\begin{bmatrix} \sin\theta & \cos\theta \\ \cos\theta & -\sin\theta \end{bmatrix}\begin{bmatrix} x1' \\ y1' \end{bmatrix} = \begin{bmatrix} \sin\theta & \cos\theta \\ \cos\theta & -\sin\theta \end{bmatrix}\begin{bmatrix} x1 & x2 \\ y1 & y2 \end{bmatrix}\begin{bmatrix} n1 \\ n2 \end{bmatrix} \\ \begin{bmatrix} \sin\theta & \cos\theta \\ \cos\theta & -\sin\theta \end{bmatrix}\begin{bmatrix} x2' \\ y2' \end{bmatrix} = \begin{bmatrix} \sin\theta & \cos\theta \\ \cos\theta & -\sin\theta \end{bmatrix}\begin{bmatrix} x2 & x1 \\ y2 & y1 \end{bmatrix}\begin{bmatrix} n1 \\ n2 \end{bmatrix} \end{Bmatrix} \quad (8)$$

$$\begin{bmatrix} x1' \\ y1' \end{bmatrix} = \begin{bmatrix} k\cos 60 \\ k\sin 60 \end{bmatrix} = \begin{bmatrix} x1 & x2 \\ y1 & y2 \end{bmatrix}\begin{bmatrix} n1 \\ n2 \end{bmatrix} = \begin{bmatrix} \cos\frac{\alpha}{2} & \cos\frac{\alpha}{2} \\ \sin\frac{\alpha}{2} & -\sin\frac{\alpha}{2} \end{bmatrix}\begin{bmatrix} n1 \\ n2 \end{bmatrix} \\ \begin{bmatrix} x2' \\ y2' \end{bmatrix} = \begin{bmatrix} x1' \\ -y1' \end{bmatrix} = \begin{bmatrix} k\cos 60 \\ -k\sin 60 \end{bmatrix} = \begin{bmatrix} x2 & x1 \\ y2 & y1 \end{bmatrix}\begin{bmatrix} n1 \\ n2 \end{bmatrix} = \\ \begin{bmatrix} \cos\frac{\alpha}{2} & \cos\frac{\alpha}{2} \\ -\sin\frac{\alpha}{2} & \sin\frac{\alpha}{2} \end{bmatrix}\begin{bmatrix} n1 \\ n2 \end{bmatrix} \end{Bmatrix} \quad (9)$$

With respect to each of the winding turns numbers n1 and n2 from Eq. (9) above, Eq. (10) or Eq. (11) below is derived.

$$\begin{bmatrix} k\cos 60 \\ k\sin 60 \end{bmatrix} = \begin{bmatrix} \cos\frac{\alpha}{2} & \cos\frac{\alpha}{2} \\ \sin\frac{\alpha}{2} & -\sin\frac{\alpha}{2} \end{bmatrix}\begin{bmatrix} n1 \\ n2 \end{bmatrix} \quad (10)$$

$$\begin{bmatrix} n1 \\ n2 \end{bmatrix} = k\begin{bmatrix} \cos\frac{\alpha}{2} & \cos\frac{\alpha}{2} \\ \sin\frac{\alpha}{2} & -\sin\frac{\alpha}{2} \end{bmatrix}^{-1}\begin{bmatrix} \cos 60 \\ \sin 60 \end{bmatrix} \quad (11)$$

For example, as shown in FIG. 3, in the case of the phase difference φ between the induced voltage vectors V1 (x1, y1) and V2 (x2, y2) prior to addition being 210 electrical degrees, the ratio of the first winding turns number n1 and the second winding turns number n2 (winding ratio n1/n2)=2.73. Accordingly, by disposing the windings 14a, 14b, 15a, and 15b in the slots 27, 28, and 29 so as to satisfy this winding ratio n1/n2, the phase difference between the induced voltage vectors Vu (=V1+V2/2.73) and Vw (=V2+V1/2.73) obtained by addition is 120 electrical degrees. Accordingly, suitable current control is possible by ordinary vector control on the assumption that the current phase difference between each of the phase currents is 2π/3=120 electrical degrees.

As stated above, according to the stator 10 of the present embodiment, the intervals between the teeth 22, 24, and 26, which are adjacent in the circumferential direction C, (that is, the widths C1, C1, and C2 of the slots 27, 28, and 29 in the circumferential direction) are set so as to be non-uniform in accordance with the number of phases of the loop windings 14a, 14b, 15a, and 15b disposed in the slots 27, 28, and 29. Thereby, compared to the case of setting the intervals between the teeth 22, 24, and 26, which are adjacent in the circumferential direction C, to the same value regardless of the number of phases of the loop windings 14a, 14b, 15a, and 15b disposed in the slots 27, 28, and 29, a decrease in the winding space factor can be prevented.

Moreover, when having added the induced voltage by the first U-phase loop winding 14a and the induced voltage by the second W-phase loop winding 15b or having added the induced voltage by the first W-phase loop winding 15a and the induced voltage by the second U-phase loop winding 14b for each of the slots 27, 28, and 29, the ratio of the first winding turns number n1 of the first U-phase loop winding 14a and the first W-phase loop winding 15a and the second winding turns number n2 of the second U-phase loop winding 14b and the second W-phase loop winding 15b (turns ratio n1/n2) is set so that the phase difference of the induced voltages obtained by addition is 120 electrical degrees. Accordingly, ordinary vector control can be readily and suitably applied to a motor provided with this stator 10 on the assumption that the current phase difference between each of the phase currents is 2π/3=120 electrical degrees.

A second embodiment of a stator of the present embodiment shall be described below with reference to the accompanying drawings.

Figure 7:
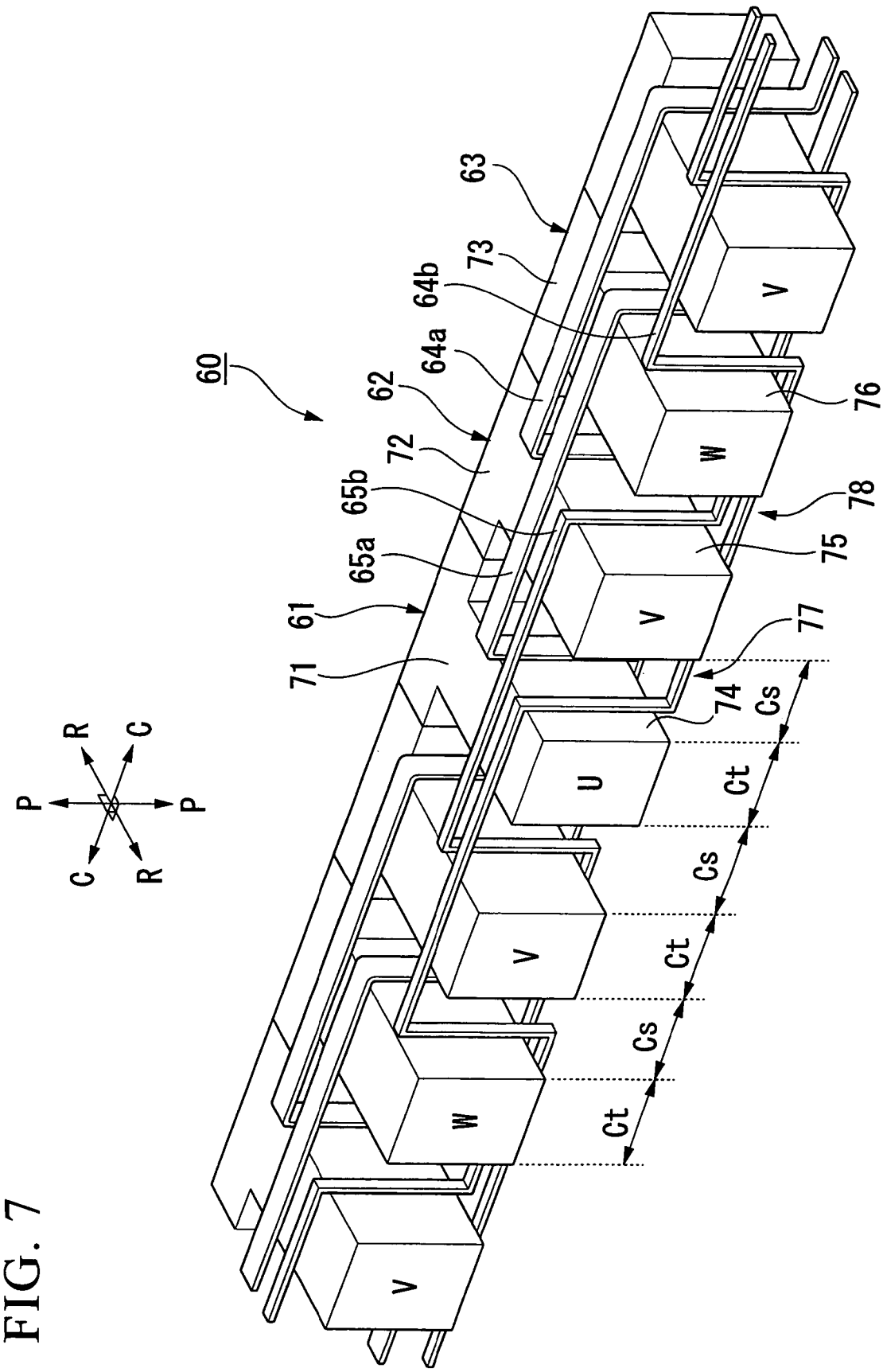
FIG. 7 shows a perspective view of a main portion of a stator according to a second embodiment of the present invention.

As shown for example in FIG. 7, a stator 60 according to this second embodiment is provided with a plurality of U-phase stator pieces 61, V-phase stator pieces 62, and W-phase stator pieces 63 for each of the three respective phases U, V, and W, and a first U-phase loop winding 64a and a second U-phase loop winding 64b of the U-phase and a first W-phase loop winding 65a and a second W-phase loop winding 65b of the W-phase.

Each of the U-phase stator pieces 61, for example, includes a U-phase yoke 71 and a U-phase tooth 74. The U-phase tooth 74 projects in the radial direction R from the U-phase yoke 71, having the same width in the axial direction as the U-phase yoke 71 and a width Ct in the circumferential direction that is smaller than the U-phase yoke 71, and has a cross-sectional shape in the radial direction R that is rectangular.

Each of the V-phase stator pieces 62, for example, includes a V-phase yoke 72 and a V-phase tooth 75. The V-phase tooth 75 projects in the radial direction R from the V-phase yoke 72, having the same width in the axial direction as the V-phase yoke 72 and a width Ct in the circumferential direction that is smaller than the V-phase yoke 72, and has a cross-sectional shape in the radial direction R that is rectangular.

Each of the W-phase stator pieces 63, for example, includes a W-phase yoke 73 and a W-phase tooth 76. The W-phase tooth 76 projects in the radial direction R from the W-phase yoke 73, having the same width in the axial direction as the W-phase yoke 73 and a width Ct in the circumferential direction that is smaller than the W-phase yoke 73, and has a cross-sectional shape in the radial direction R that is rectangular.

The plurality of U-phase stator pieces 61, V-phase stator pieces 62, and W-phase stator pieces 63 are arranged in a circular shape in a specified order along the circumferential direction C. The U-phase yoke 71 of the U-phase stator piece 61 and the V-phase yoke 72 of the V-phase stator piece 62 that are adjacent in the circumferential direction C are connected by their end portions in the circumferential direction. The V-phase yoke 72 of the V-phase stator piece 62 and the W-phase yoke 73 of the W-phase stator piece 63 that are adjacent in the circumferential direction C are connected by their end portions in the circumferential direction. A slot 77 is formed between the U-phase tooth 74 of the U-phase stator piece 61 and the V-phase tooth 75 of the V-phase stator piece 62, which are adjacent in the circumferential direction C. A slot 78 is formed between the V-phase tooth 75 of the V-phase stator piece 62 and the W-phase tooth 76 of the W-phase stator piece 63, which are adjacent in the circumferential direction C. The first U-phase loop winding 64a and the second W-phase loop winding 65b of two phases, or the second U-phase loop winding 64b and the first W-phase loop winding 65a of two phases are disposed in the slots 77 and 78.

The loop windings 64a, 64b, 65a, and 65b are full-pitch wave windings that are mounted at the U-phase teeth 74, the V-phase teeth 75, and the W-phase teeth 76 so as to weave between the specified U-phase teeth 74 and V-phase teeth 75 (the slot 77) and between the specified V-phase teeth 75 and the W-phase teeth 76 (the slot 78) while, for example, meandering within the circumferential surface around the axis. The first U-phase loop winding 64a and the second U-phase loop winding 64b are connected to each other in series. The first W-phase loop winding 65a and the second W-phase loop winding 65b are connected to each other in series.

The first U-phase loop winding 64a and the first W-phase loop winding 65a, and the second U-phase loop winding 64b and the second W-phase loop winding 65b are disposed at relatively shifted positions along the circumferential direction C so as to have a phase difference of 270 electrical degrees.

The U-phase teeth 74 are sandwiched from both sides in the axial direction P by the lateral portions of the first U-phase loop winding 64a and the first W-phase loop winding 65a that are disposed on the first side (lower side in FIG. 7) in the axial direction P, and by the lateral portions of the second U-phase loop winding 64b and the second W-phase loop winding 65b that are disposed on the second side (upper side in FIG. 7).

The V-phase teeth 75 are sandwiched from both sides in the axial direction P by the lateral portions of the first U-phase loop winding 64a and the second U-phase loop winding 64b that are disposed on the first side (lower side in FIG. 7) in the axial direction P, and by the lateral portions of the first W-phase loop winding 65a and the second W-phase loop winding 65b that are disposed on the second side (upper side in FIG. 7), or by the lateral portions of the first W-phase loop winding 65a and the second W-phase loop winding 65b that are disposed on the first side (lower side in FIG. 7) in the axial direction P and by the lateral portions of the first U-phase loop winding 64a and the second U-phase loop winding 64b that are disposed on the second side (upper side in FIG. 7).

The W-phase teeth 76 are sandwiched from both sides in the axial direction P by the lateral portions of the second U-phase loop winding 64b and the second W-phase loop winding 65b that are disposed on the first side (lower side in FIG. 7) in the axial direction P, and by the lateral portions of the first U-phase loop winding 64a and the first W-phase loop winding 65a that are disposed on the second side (upper side in FIG. 7).

Figure 8:
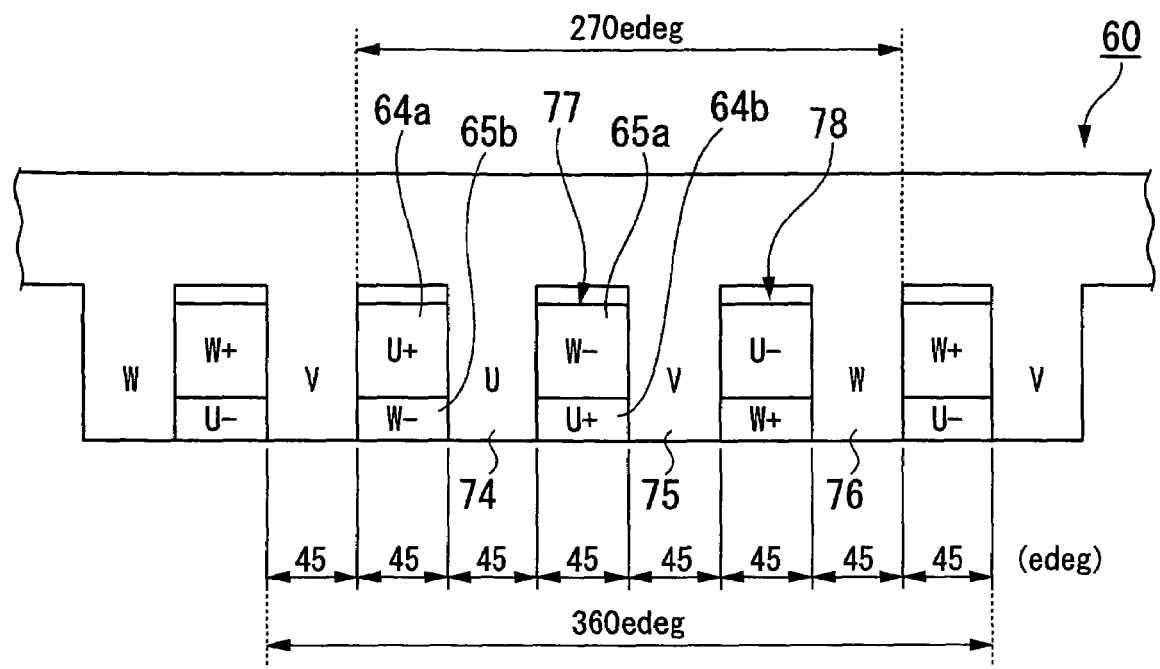
FIG. 8 is a drawing schematically showing a cross section with respect to an axial direction P of the stator according to the second embodiment of the present invention.

In FIG. 8 that schematically shows a cross section of the stator 60 with respect to the axial direction P, for example in the case of traversing the circumference along the circumferential direction C, the U-phase loop windings 64a and 64b disposed in the UV-phase slots 77 so as to head from the second side to the first side in the axial direction P are "U+", and the U-phase loop windings 64a and 64b that are disposed in the VW-phase slots 78 so as to head from the first side to the second side in the axial direction P are "U−". Also, for example in the case of traversing the circumference along the circumferential direction C, the W-phase loop windings 65a and 65b disposed in the VW-phase slots 78 so as to head from the second side to the first side in the axial direction P are "W+", and the W-phase loop windings 65a and 65b disposed in the UV-phase slots 77 so as to head from the first side to the second side in the axial direction P are "W−".

As shown in FIG. 7, the teeth 74, 75, and 76 of the stator pieces 61, 62, and 63, respectively, all have a width Ct in the circumferential direction. The intervals between the teeth 74, 75, and 76 that are adjacent in the circumferential direction C, that is, the width Cs of the slots 77 and 78 in the circumferential direction, are all set to the same value.

Thereby, the width Ct of the teeth 74, 75, and 76 in the circumferential direction and the width Cs of the slots 77 and 78 in the circumferential direction are equivalent to 45 electrical degrees.

The first U-phase loop winding 64a and the first W-phase loop winding 65a are set to have an equivalent first winding turns number n1. Also, the second U-phase loop winding 64b and the second W-phase loop winding 65b are set to have an equivalent second winding turns number n2. Moreover, the ratio of the first winding turns number n1 to the second winding turns number n2 (winding turns ratio n1/n2) is set to a specified value explained below.

The ratio of the first winding turns number n1 of the first U-phase loop winding 64a and the first W-phase loop winding 65a, and the second winding turns number n2 of the second U-phase loop winding 64b and the second W-phase loop winding 65b (winding turns ratio n1/n2) is set to a value so that when adding the induced voltage by the first U-phase loop winding 64a and the induced voltage by the second W-phase loop winding 65b, or adding the induced voltage by the first W-phase loop winding 65a and the induced voltage by the second U-phase loop winding 64b, the phase difference of the induced voltages obtained by addition is 120 electrical degrees, for each of the slots 77 and 78. That is, the winding turns number of each of the loop windings is set so that the (added) induced voltages in the slots 77 and 78 have a phase difference of 120 electrical degrees between the slots 77 and 78.

The first and second U-phase loop windings 64a and 64b connected in series and the first and second W-phase loop windings 65a and 65b connected series are connected in a V-shape and energized with sine waves having a mutual phase difference of 120 electrical degrees. Thereby, when leakage flux can be disregarded, a rotating magnetic field is produced similar to that of a stator of a three-phase motor in which its coils of the U, V, and W-phases are connected in a Y-shape and energized by sine waves with a mutual phase difference of 120°.

Figure 9:
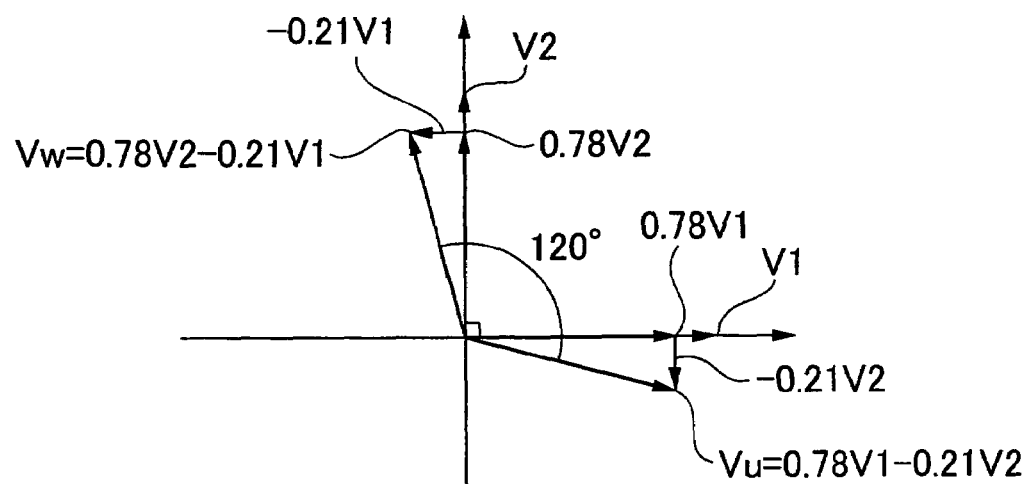
FIG. 9 is a drawing showing examples of induced voltage vectors V1 and V2 prior to addition and induced voltage vectors Vu and V2 after addition.

That is, as shown in FIG. 9, in the case of the phase difference φ between the induced voltage vectors V1 (x1, y1) and V2 (x2, y2) prior to addition being 270 electrical degrees, the ratio of the first winding turns number n1 and the second winding turns number n2 (winding turns ratio n1/n2)=0.78/0.21. Accordingly, by disposing the windings 64a, 64b, 65a, and 65b in the slots 77 and 78 so as to satisfy this winding turns ratio n1/n2, the phase difference between the induced voltage vectors Vu=(0.78V1−0.21V2) and Vw=(0.78V2−0.21V1) obtained by addition is 120 electrical degrees. Accordingly, suitable current control is possible by ordinary vector control on the assumption that the current phase difference between each of the phase currents is 2π/3=120 electrical degrees.

In the embodiment described above, the first winding turns number n1 and the second winding turns number n2 were set to values that satisfy the specified winding turns ratio n1/n2, but are not limited thereto. For example, the first winding turns number n1 and the second winding turns number n2 may be set so that the ratio of the first winding turns number n1 and the second winding turns number n2 which are each integers becomes a value closest to the specified winding ratio n1/n2.

Also, the widths C1, C1, and C2 of the slots 27, 28, and 29 in the circumferential direction, respectively, and the width Cs of the slots 77 and 78 in the circumferential direction may be set so that the specified winding turns ratio n1/n2 becomes a suitable ratio of integer values.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A stator used for a three-phase motor comprising:
   loop windings of two phases;
   a plurality of teeth that are adjacent in a circumferential direction; and
   slots formed between the teeth,
   wherein winding turn ratios of the loop windings of the two phases differ between adjacent slots in the circumferential direction,
   wherein the loop windings of the stator has only two phases,
   wherein a phase ratio of the plurality of teeth and the loop windings is set to be 1:1, and
   wherein a winding turns ratio of the loop windings of two phases disposed in each slot is set so that an electrical angle phase difference of each phase is approximately 120 electrical degrees, said each phase obtained by adding the induced voltages of the loop windings of the two phase disposed in each slot.

2. The stator according to claim 1, wherein:
   the loop windings of two phases are short-pitch windings; and
   the interval in the circumferential direction between the teeth that are adjacent in the circumferential direction is set to be non-uniform.

3. The stator according to claim 1, wherein a winding turns ratio of the loop windings of two phases disposed in each slot is set so that an electrical angle phase difference of each phase is substantially equivalent.

4. The stator according to claim 2, wherein a width of each of the slots in the circumferential direction is set to a value proportional to a total number of windings of the loop windings of the two phases disposed in the slot.

* * * * *